United States Patent [19]
Whitehurst

[11] 3,866,985
[45] Feb. 18, 1975

[54] TRACK ROLLER

[75] Inventor: Gerald E. Whitehurst, East Peoria, Ill.

[73] Assignee: Caterpillar Tractor Co., Peoria, Ill.

[22] Filed: Mar. 4, 1974

[21] Appl. No.: 447,986

[52] U.S. Cl. .................... 308/20, 308/36.1, 305/14
[51] Int. Cl. ........................................... F16c 13/02
[58] Field of Search .............. 308/18, 20, 36.1, 109; 305/14, 28, 27

[56] References Cited
UNITED STATES PATENTS

| | | | |
|---|---|---|---|
| 3,515,446 | 6/1970 | Maguire | 308/20 |
| 3,685,871 | 8/1972 | Foreman | 308/18 X |
| 3,744,860 | 7/1973 | Casey | 308/109 |
| 3,773,393 | 11/1973 | Story et al. | 308/18 X |

*Primary Examiner*—M. Henson Wood, Jr.
*Assistant Examiner*—Gene A. Church
*Attorney, Agent, or Firm*—Caterpillar Tractor Co.

[57] ABSTRACT

A track roller having a rim for rotation about an elongated shaft including a pair of cylindrical retainer sleeves individually positionable in axially spaced, radially supporting relation within a centrally disposed bore formed through the rim and about a respective one of a pair of axially spaced bearing surfaces formed on a relatively large diameter center portion of the shaft. Each of the retainer sleeves is provided with a flange formed on one end thereof having a radially outwardly extending flange portion positionable along a respective one of a pair of opposed, axially spaced end faces of the rim and a radially inwardly extending flange portion positionable along a respective one of a pair of opposed thrust surfaces defined at the opposite ends of the center portion of the shaft. A plurality of elongated tie bolts are extendible between the retainer sleeves axially to clamp the outwardly extending flange portions against the opposed end faces of the rim to secure the rim and retainer sleeves in unitary assembly about the shaft.

6 Claims, 1 Drawing Figure

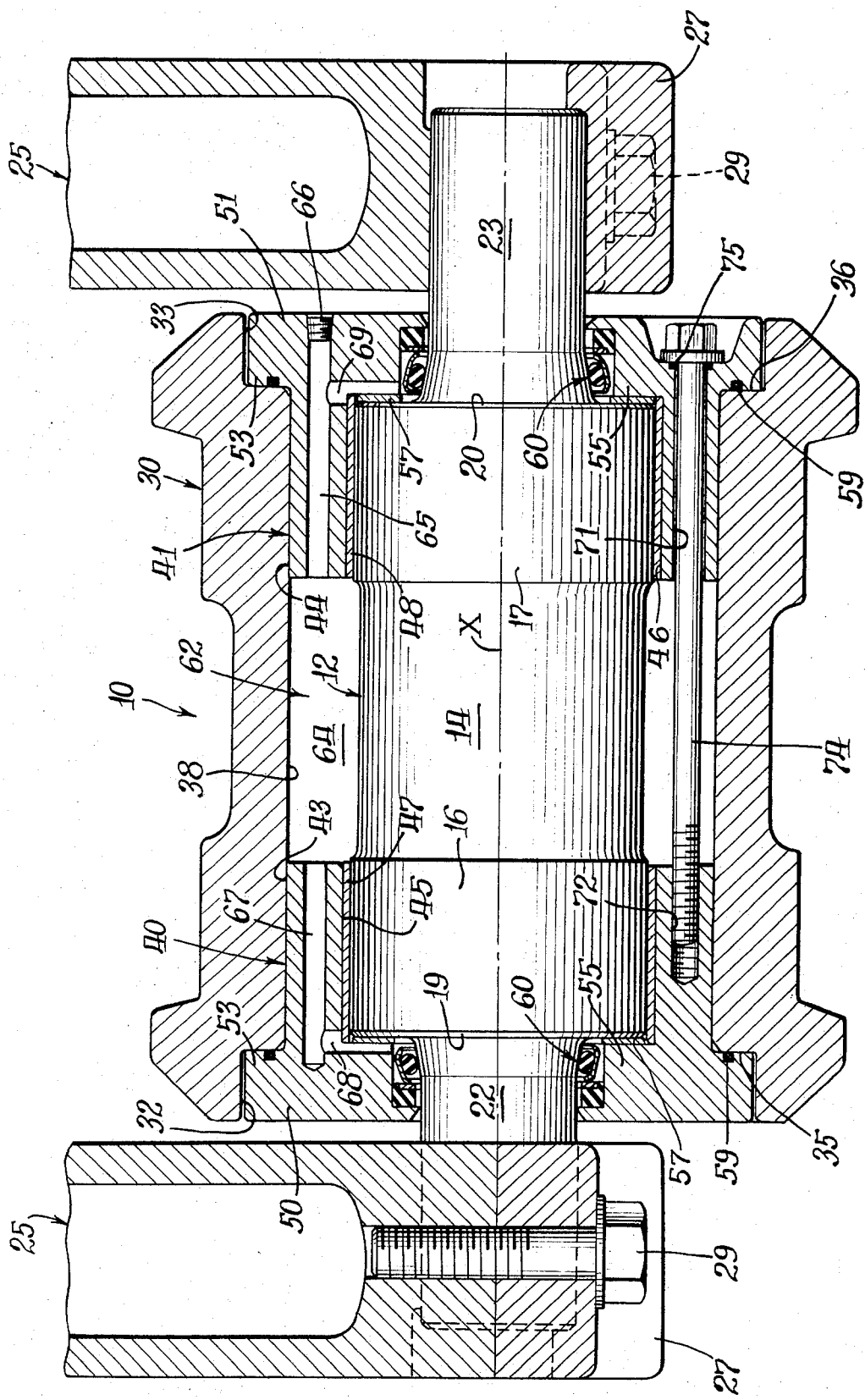

TRACK ROLLER

BACKGROUND OF THE INVENTION

Track rollers used on track-type vehicles are subjected to extremely heavy duty service in operation due to exposure to deleterious, highly abrasive environmental conditions and to severe and frequent impact loads. Consequently, such track rollers are plagued with relatively high service costs, short wear life and numerous other problems associated with their operation.

One of such problems is the enlargement and flaring out of the track roller rim commonly known as bell-mouthing. While bell-mouthing is in itself a disadvantage, a more severe problem usually results therefrom because the consequent enlargement of the rim causes a loose fit between the sleeve bearings and the stationary shaft normally employed in such track rollers, resulting in premature failure of such bearings.

Another problem is caused by undue shaft deflection under high load conditions. Those skilled in the art will appreciate that such shaft deflection will cause corner loading of the bearings, as well as the sealing components employed in the track roller, which will also result in an accelerated wear rate or premature failure of such components.

In prior art constructions where the rotary seal elements are disposed between the track roller and a stationary member, such as an end cap, rigidly fixed to the track roller supporting frame, leakage of lubricating fluid past such rotary seal elements is frequently a problem because of relative bending of the respective frame members due to severe forces imposed thereon during operation. Such bending frequently results in substantial undesired changes in the loading of the sealing faces of such elements which, when too loose, results in immediate leakage therepast or, when too tight, results in eventual leakage due to increased wear.

Another problem is that many track rollers do not contain a sufficient quantity of lubricating fluid to adequately lubricate and cool the bearings and sealing components of the track roller during extended periods of operation to prevent premature wear without frequent lubrication.

In the past, track roller developments have been addressed only to a single or perhaps a few of the above problems. Representative of such prior developments are those illustrated in U.S. Pat. No. 2,693,397 to Baker; U.S. Pat. No. 3,082,047 to Bernotas; U.S. Pat. No. 3,154,958 to Cadwell et al; U.S. Pat. No. 3,586,398 to Dadds et al.; and U.S. Pat. No. 3,744,860 to Casey. However, the track rollers utilizing such prior developments have not been completely successful because none have fully overcome all of the above problems and because of their complexity and high repair costs.

OBJECTS OF THE INVENTION

Accordingly, it is an object of this invention to provide an improved heavy duty track roller affording high load carrying capabilities with a minimum number of components.

Another object of this invention is to provide such a track roller of relatively simple construction with easily replaceable, economically manufactured components.

Another object of this invention is to provide such a track roller having a prolonged life expectancy by minimizing undue wear and premature failure of its various components.

Other objects and advantages of the present invention will become more readily apparent upon reference to the accompanying drawing and following description.

BRIEF DESCRIPTION OF THE DRAWING

The drawing is a vertical longitudinal cross section through a track roller embodying the principles of the present invention shown mounted on a track roller frame.

DESCRIPTION OF THE PREFERRED EMBODIMENT

Referring more particularly to the drawing, an improved track roller, embodying the principles of the present invention, is generally indicated by the reference numeral 10 and includes an elongated stationary shaft 12 having a longitudinal axis X. The shaft is provided with a relatively large diameter center portion 14 having a pair of longitudinally spaced cylindrical bearing surfaces 16 and 17. A pair of radially disposed shoulders or thrust surfaces 19 and 20 are formed at the opposite ends of the center portion of the shaft. A pair of opposite reduced diameter mounting end portions 22 and 23 of the shaft are individually outwardly extended from the shoulders. The shaft is secured at its mounting end portions to a track roller frame 25 by a pair of end caps 27 and bolts 29 in the usual manner.

The track roller 10 also includes a cylindrical track engaging rim 30. Such rim is preferably constructed of steel which is through hardened by heat treatment and includes a pair of annular recesses 32 and 33 defining a pair of opposed radially extending end faces 35 and 36 through which a longitudinal centrally disposed bore 38 is formed.

A pair of longitudinally spaced cylindrical retainer sleeves 40 and 41 are provided with outer peripheries 43 and 44, respectively, dimensioned to be slidably received within the opposite ends of the bore 38 of the rim and are utilized for radially supporting the rim upon the shaft in a manner to be hereinafter described. The retainer sleeves are also provided with cylindrical inner peripheries 45 and 46. A pair of sleeve bearings 47 and 48 are press fitted into the inner peripheries for rotatably mounting the retainer sleeves about the respective bearing surfaces 16 and 17 of the shaft 12.

A pair of flanges 50 and 51 are individually formed on the outer ends of the retainer sleeves 40 and 41, respectively. Each of such flanges are provided with a radially outwardly extending flange portion 53 which is positionable in abutting relation with a respective one of the end faces 35, 36 of the rim and a radially inwardly extending flange portion 55 positionable along a respective one of the thrust surfaces 19, 20 of the shaft.

A pair of thrust bearings 57 are secured in any conventional manner, such as by bonding or by pins, not shown, to the inwardly extending portions 55 in radially abutting relation with the respective thrust surfaces of the shaft.

A pair of annular seals 59, preferably of elastomeric material, are disposed in grooves formed in the outwardly extending flange portions 53 of the retainer sleeves 40 and 41 to abut the corresponding end faces 35 and 36 of the rim for sealing purposes. A pair of rotary seal elements 60 are disposed between the inwardly extending flange portions 55 and the respective mounting end portions 22 and 23 of the shaft for retaining lubricating fluid within the track roller.

A lubricating system 62 for the track roller includes a relatively large, annular shaped fluid reservoir 64 defined between the bore 38 and the periphery of the center portion 14 of the shaft 12 and the inner ends of the retainer sleeves 40 and 41. Such fluid reservoir is adapted to be filled with a standard lubricating fluid through an axially disposed passage 65 formed through the retainer sleeve 41. The outer end of such passage is normally closed by a removable plug 66. A similar axial passage 67 is formed in the other retainer sleeve 40. A pair of radial passages 68 and 69 individually intersect their respectively associated passages 65 and 67 for directing lubricating fluid from the reservoir 64 to the thrust bearings 57 and rotary seal elements 60. While other filling structures and procedures are known to those skilled in the art, the above-described arrangement is particularly beneficial because it eliminates the need for lubricating grooves and passages in the shaft or the rim. It will be appreciated that such passages and grooves would tend to weaken the shaft and complicate its construction. Also, tapped holes are nearly impossible to machine in hardened material, such as the rim 30.

A plurality of circumferentially spaced, axially disposed bores, one of which is shown at 71, are formed through the retainer sleeve 41. A like plurality of threaded apertures, one of which is shown at 72, are formed into the inner end of the retainer sleeve 40 and are positionable in axial alignment with the bores 71 of the retainer sleeve 41 for individually receiving one of a plurality of elongated tie bolts 74. Elastomeric seals 75 are disposed in grooves formed about the outer ends of the bores 71 in abutting relation with the heads of the bolts 74 for sealing purposes.

OPERATION

While the operation of the present invention is believed to be clearly apparent from the foregoing description, further amplification will be made in the following brief description of such operation. The track roller 10 is assembled by firstly mounting the thrust bearings 57, seals 59, and rotary seal elements 60 to their respective retainer sleeves 40 and 41 and by press fitting the sleeve bearings 47, 48 into the inner peripheries 45 and 46, respectively, thereof. Next, the shaft 12 is inserted through the rim 30 and the subassembled retainer sleeves 40 and 41 mounted into their respective ends of the bore 38 of the rim. It should be noted that the outer peripheries of the retainer sleeves are dimensioned to slide into the bore rather than being press fitted thereinto which greatly facilitates the serviceability of the track roller. More importantly, the retainer sleeves are not deformed inwardly upon their assembly into the rim and therefore are not subject to stresses in the area where bell-mouthing of the rim usually occurs. Consequently, the normal tendency of the retainer sleeves to expand with the rim when bell-mouthing occurs is greatly minimized and longer bearing life is realized through maintaining the proper fit between the bearings and the shaft.

The assembly of the track roller is completed by inserting the tie bolts 74 through the bores 71 and by screw threadably engaging them into their respective threaded apertures 72. Tightening of the tie bolts is effective in bringing the outwardly extending flange portions 53 of the retainer sleeves into clamped engagement against the end faces 35 and 36 of the rim 30 to secure the rim and retainer sleeves in unitary assembly.

The particular construction of the present track roller 10 permits the complete assembly of the track roller as a unit, including the lubricating fluid, before being mounted on the track roller frame. As a completely sealed unit, the track roller is more conveniently stored in inventory without fear of contamination by dirt or the like or suffering the loss of loose parts. Furthermore, removal or replacement of the track roller or the track frame is possible without sacrificing the integrity of the sealed unit.

The advantages of the present track roller should be readily apparent to those skilled in the art. Firstly, the rim 30 is provided with a relatively thin, uniform cross section requiring no tapped holes or other difficult machining, which enables the rim to be through hardened to minimize bell-mouthing and provide better wearability. This also makes the rim a less costly replacement item. Secondly, the rim and sleeve members are secured by the relatively long tie bolts 74 which exhibit sufficient elasticity to prevent loosening during operation.

Another advantage is the prevention of undue shaft deflection which is afforded by the relatively large diameter center portion 14 of the shaft 12. However, the relatively small diameter rotary seal elements 60 are provided about the reduced diameter end portions 22 and 23 to reduce the heat generated by such seal elements during operation and extend their wear life. Also, unlike many prior art track rollers, such rotary seal elements are carried solely by the retainer sleeves 40 and 41, respectively, instead of being disposed between the end caps 27 and the retainer sleeves or any such analogous parts of conventional track roller constructions. Consequently, the relative bending of the respective frame members to which such end caps are rigidly secured, resulting in the leakage problem denoted earlier, does not affect the integrity of such seal elements.

While the invention has been described and shown with particular reference to the preferred embodiment, it will be apparent that variations might be possible that would fall within the scope of the present invention, which is not intended to be limited except as defined in the following claims.

What is claimed is:

1. A track roller for rotation about a predetermined axis comprising;
    a cylindrical rim concentric to said axis and including a pair of opposed, axially spaced end faces and a longitudinal, centrally disposed bore formed therethrough transpiercing said end faces;
    an elongated, longitudinally disposed shaft including a relatively large diameter center portion having a pair of axially spaced cylindrical bearing surfaces formed thereon and opposite ends defining a pair of opposed, axially spaced thrust surfaces;
    a pair of cylindrical retainer sleeves individually positionable in axially spaced, radially supporting relation within said bore of said rim and about a respective one of said bearing surfaces of said shaft, each of said retainer sleeves being provided with a flange formed on one end thereof having a radially outwardly extending flange portion positionable along a respective one of said end faces of said rim and a radially inwardly extending flange portion positionable along a respective one of said thrust surfaces of said shaft; and tie means extendible between said retainer sleeves axially to clamp said outwardly extending flange portions of said retainer sleeves against the opposed end faces of said rim to secure said rim and said retainer sleeves in unitary assembly about said shaft.

2. The track roller of claim 1 including;

a pair of cylindrical sleeve bearings individually press fitted into a respective one of said retainer sleeves and engageable with a corresponding one of said bearing surfaces of said shaft for rotatably supporting said retainer sleeves therearound; and a pair of annular thrust bearings individually mounted to a respective one of said inwardly extending flange portions of said retainer sleeves in thrust engaging relation with a corresponding one of said opposed thrust surfaces of said shaft to limit axial movement of the unitary assembly relative to said shaft.

3. The track roller of claim 2 wherein one of said retainer sleeves is provided with a plurality of circumferentially spaced bores formed therethrough in axially offsetting relation intermediate said rim and said shaft, and the other of said retainer sleeves is provided with a like plurality of threaded apertures formed in its other end opposite said flange and positionable in axial alignment with said circumferentially spaced bores; and said tie means includes a plurality of elongated tie bolts individually extendible through said circumferentially spaced bores and screw threadably engageable with said threaded apertures.

4. The track roller of claim 3 including;

a pair of reduced diameter mounting end portions individually axially extending from the opposite ends of said center portion of said shaft; and a pair of support brackets embracing each of the mounting end portions for attaching said shaft to a supporting frame.

5. The track roller of claim 4 including lubricating means comprising a relatively large annular shaped fluid reservoir defined between said shaft and the rim and intermediate said retainer sleeves to contain a relatively large supply of lubricating fluid for lubricating said bearings during extended periods of operation.

6. The track roller of claim 5 including seal means to prevent the escape of said lubricating fluid from said track roller comprising a pair of rotary seal elements disposed between the inwardly extending flange portions of each of said retainer sleeves and the respective one of the mounting end portions of the shaft, and a pair of static seals disposed between the outwardly extending flange portions of each of said retainer sleeves and respectively associated end faces of said rim.

* * * * *